(12) United States Patent
Naganawa et al.

(10) Patent No.: US 12,090,453 B2
(45) Date of Patent: Sep. 17, 2024

(54) NOZZLE FOR LIQUID PHASE EJECTION

(71) Applicants: Japan Atomic Energy Agency, Ibaraki (JP); Junkosha Inc., Kasama (JP)

(72) Inventors: Hirochika Naganawa, Tokai-mura (JP); Tetsushi Nagano, Tokai-mura (JP); Hirofumi Ito, Tokyo (JP); Ryosuke Sato, Kasama (JP)

(73) Assignees: Japan Atomic Energy Agency, Ibaraki (JP); Junkosha Inc., Kasama (JP)

( * ) Notice: Subject to any disclaimer, the term of this patent is extended or adjusted under 35 U.S.C. 154(b) by 933 days.

(21) Appl. No.: 17/257,086

(22) PCT Filed: Mar. 31, 2020

(86) PCT No.: PCT/JP2020/014843
§ 371 (c)(1),
(2) Date: Dec. 30, 2020

(87) PCT Pub. No.: WO2021/002072
PCT Pub. Date: Jan. 7, 2021

(65) Prior Publication Data
US 2021/0197145 A1 Jul. 1, 2021

(30) Foreign Application Priority Data
Jul. 4, 2019 (JP) .................. 2019-125457

(51) Int. Cl.
*B01D 11/04* (2006.01)
*B01F 23/41* (2022.01)
*B01F 25/313* (2022.01)
*B01F 101/00* (2022.01)

(52) U.S. Cl.
CPC ........ *B01F 25/31331* (2022.01); *B01D 11/04* (2013.01); *B01F 23/41* (2022.01); *B01F 2101/2204* (2022.01)

(58) Field of Classification Search
CPC .......... B01D 11/04; B01F 23/41; B01F 25/23; B01F 25/31331; B01F 35/7182
See application file for complete search history.

(56) References Cited

FOREIGN PATENT DOCUMENTS

| CN | 1431516 A | 7/2003 |
|---|---|---|
| EP | 2 503 330 A2 | 9/2012 |
| JP | 59-182801 A | 10/1984 |
| JP | 5-192907 A | 8/1993 |
| JP | 2001-294602 A | 10/2001 |

(Continued)

OTHER PUBLICATIONS

Osanawa et al—JP 2016-123907 machine translation (Year: 2016).*

(Continued)

*Primary Examiner* — Bradley R Spies
(74) *Attorney, Agent, or Firm* — Crowell & Moring LLP

(57) ABSTRACT

A nozzle for spouting a liquid phase, in which one liquid phase in a two-liquid phase system can be stably jetted as highly dispersible droplets while suppressing coalescence of droplets, and accumulation of fine solid components in the nozzle hardly occurs. The nozzle has a structure in which capillary tubes or pores are assembled. Further, the capillary tubes or the pores are formed using a suitable material having a low affinity for organic or a low affinity for water, or a material subjected to appropriate surface treatment.

4 Claims, 24 Drawing Sheets

(56) References Cited

FOREIGN PATENT DOCUMENTS

| JP | 2010-504521 A | 2/2010 |
| JP | 2016-123907 A | 7/2016 |

OTHER PUBLICATIONS

Masuda et al—JP2001-294602 FIT translation (Year: 2001).*
Hirano et al—JPH05-192907 FIT trasnlation (Year: 1993).*
International Search Report (PCT/ISA/210) issued in PCT Application No. PCT/JP2020/014843 dated Jun. 30, 2020 (three (3) pages).
Japanese-language Written Opinion (PCT/ISA/237) issued in PCT Application No. PCT/JP2020/014843 dated Jun. 30, 2020 (six (6) pages).

* cited by examiner (1)

SIDE VIEW OF BUNDLED CAPILLARY TUBE NOZZLE
(CLOSELY ATTACHED CAPILLARY TUBES)

TOP VIEW OF BUNDLED CAPILLARY TUBE NOZZLE
(CIRCULAR TYPE AND HEXAGON TYPE)

TOP VIEW OF BUNDLED CAPILLARY TUBE NOZZLE
(SQUARE TYPE)

(1)

SIDE VIEW OF PROTRUDING CAPILLARY TUBE NOZZLE
(NON-CONTACT CAPILLARY TUBES)

(2)

TOP VIEW OF PROTRUDING CAPILLARY TUBE NOZZLE
(CIRCULAR TYPE)

(3)

TOP VIEW OF PROTRUDING CAPILLARY TUBE NOZZLE
(SQUARE TYPE)

SIDE VIEW OF POROUS PLATE NOZZLE
(NON-CONTACT PORES)

(2)

TOP VIEW OF POROUS PLATE NOZZLE
(CIRCULAR TYPE)

(3)

TOP VIEW OF POROUS PLATE NOZZLE
(SQUARE TYPE)

CAPILLARY TUBES (DIFFERENT LENGTHS) 1

UNIT
(PROTRUDING CAPILLARY TUBE NOZZLE HAVING
DIFFERENT LENGTHS OF CAPILLARY TUBES)

UNIT
(PROTRUDING CAPILLARY TUBE NOZZLE HAVING
DIFFERENT LENGTHS OF CAPILLARY TUBES)

NOZZLE FOR LIQUID PHASE EJECTION

BACKGROUND OF THE INVENTION

The present invention relates to a nozzle for spouting a liquid phase, which is particularly effective for generating an emulsion in a liquid-liquid extraction apparatus in which an aqueous phase and an organic phase are spouted as droplets by liquid feeding so that they reach an emulsion state.

Because the present invention can mix an aqueous phase and an organic phase up to an emulsion state, the use in the liquid-liquid extraction (also referred to as solvent extraction) is considered as one of its applications. The liquid-liquid extraction is used in various industrial fields for the purpose of extracting the target component in an aqueous phase to an organic phase in a two-liquid phase system composed of the aqueous phase and the organic phase, and/or the purpose of refining the target component by collecting impurities in the aqueous phase into the organic phase. The liquid-liquid extraction is specifically used for the elemental separation in metal purification or recycling, the separation and recovery of compounds produced in chemical synthesis in the pharmaceutical, food, or chemical industries, the removal of harmful components in wastewater, and the like.

When the aqueous phase and the organic phase are mixed and emulsified, rotation of a stirring blade, or mechanical stirring using shaking or vibration is used in general. As an emulsifying device, for example, a homogenizer that performs mechanical stirring by rotation of a shaft having a shearing blade at its tip is well known. Further, as a method of eliminating an emulsion state, it is known to allow the mixture to stand and wait for phase separation by gravity, or to rapidly perform the phase separation by centrifugation.

The most widespread industrial liquid-liquid extraction method is a mixer-settler method in which an aqueous phase and an organic phase are mixed by mechanical stirring with a stirring blade, and two-liquid phases are separated by gravity. An apparatus using the mixer-settler method has a relatively simple structure including a two-liquid phase mixing part (mixer part) and a two-liquid phase separation part (settler part). Such an apparatus can stably perform highly efficient liquid-liquid extraction, and is the most typical apparatus for liquid-liquid extraction.

In addition, a centrifugal extraction method has been developed in which the separation of two-liquid phases (phase separation) is accelerated by centrifugation by improving the mixer-settler method. However, this apparatus is not widely used as in the mixer settler method because of the following points.

(1) In order to maintain balance in centrifugation, there is a restriction on use that it is necessary to eliminate solid components (particle components) as much as possible;
(2) The regular overhaul and parts replacement are required because of the complication of equipment structure; and
(3) There is a cost problem that a large amount of power is consumed to generate a strong centrifugal force continuously.

On the other hand, in the emulsion flow method developed in recent years, the aqueous phase and the organic phase can be mixed to form an emulsion state simply by sending liquid by a pump or the like without using mechanical external force such as the rotation or the shaking of a stirring blade. Further, the emulsion-formed two-liquid phases can be rapidly separated into a clear state without waiting for gravity separation and without performing centrifugation (Patent documents 1 to 5). In addition, an apparatus using the emulsion flow method has a very simple structure, and its operation is also very simple.

For example, a counter-current emulsion flow apparatus (Patent Document 1) includes a two-liquid phase mixing part in which an aqueous phase and an organic phase are emulsified and mixed, an organic phase separation part and an aqueous phase separation part located above and below the liquid-phase mixing part, respectively. It has a simple container structure, and an aqueous phase spouting nozzle and an organic phase spouting nozzle are installed in the two-liquid phase mixing part. Emulsification (emulsion mixing) is achieved by the countercurrent contact between the aqueous phase and the organic phase in the two-liquid phase mixing part. When the emulsion enters the organic phase separation part and the aqueous phase separation part from the two-liquid phase mixing part, the linear velocity of the droplet passing through decreases due to the increase in the cross-sectional area, and coalescence due to collision of the droplets is promoted, and thus the rapid phase separation is caused by the cancellation of emulsion mixing.

In the emulsion flow apparatus, ideal liquid-liquid extraction is realized by simultaneous progress of the mixing and the rapid phase separation of the two-liquid phases leading to an emulsion state. Further, since the liquid-liquid extraction can be performed only by use of a very simple container structure and an extremely simple operation of liquid feeding, the lowest cost can be realized. That is, the highest level of performance and the lowest cost are compatible. In such a conventional emulsion flow apparatus, as a nozzle installed in the two-liquid phase mixing part, a nozzle made of a plate obtained by sintering glass beads or the like is used.

BRIEF SUMMARY OF THE INVENTION

The emulsion flow apparatus, which is one example in which the present invention is expected to be used, is a revolutionary method as described above, and has attracted attention in various industrial fields. However, there are still problems to be solved in promoting commercial use. Specifically, there is a problem with a droplet spouting nozzle, which is a component that greatly affects the performance of the emulsion flow apparatus.

As described above, in the emulsion flow apparatus, a plate obtained by sintering glass beads is often used as a nozzle member for spouting an organic phase as droplets. Glass has high oil repellency to organic solvents such as alkanes because of its high hydrophilicity, and thus is excellent as a material for nozzles for spouting an organic phase. On the other hand, in the case of using a conventional glass bead sintered plate nozzle, depending on the properties of the organic phase, the coalescence of the droplets is likely to occur, and the organic phase cannot be spouted into the aqueous phase as highly dispersible droplets. For example, when alcohols or ketones known as polar solvents are used as an organic phase, good (highly dispersible) emulsion mixing cannot be achieved by jetting droplets with a glass-bead-sintered plate nozzle.

Further, in a conventional nozzle using a glass bead sintered plate, the flow path structure inside the sintered plate is complicated and irregular. For this reason, it has been found that a fine solid component (particle component) tends to accumulate in the flow channel after a long-term use. By using a glass sintered plate that has a sufficiently large pore size with respect to the particle size of the fine solid component (particle component) contained in the organic phase, nozzle clogging does not occur in the short term and there is no change in droplet spouting performance at the beginning of operation. However, with use for a long period of time (for example, several months), fine solid components gradually accumulate in the nozzle, and the performance of droplet spouting is deteriorated.

The period during which the nozzle can be used continuously while its performance is maintained depends on the amount, size, and type of the solid component. As the solid component accumulates, it eventually fails to function as a nozzle. Further, in the case of a solid component having low solubility, the performance of the nozzle may not be recovered even when the solid component is washed with an acid or the like.

Therefore, an object of the present invention is to provide a nozzle for spouting a liquid phase which can stably spout the liquid phase as highly dispersible droplets, while suppressing coalescence of droplets in a two-liquid phase system composed of an aqueous phase and an organic phase. Another object of the present invention is to provide a nozzle for spouting a liquid phase, which is effective as an emulsion generating nozzle, in which accumulation of fine solid components is unlikely to occur.

A conventional organic phase spouting nozzle using a glass bead sintered plate works effectively when the main component of the organic phase is a hydrocarbon solvent, but it does not work with highly polar solvents such as alcohols and ketones. Therefore, it is not always effective and often does not obtain a stable emulsion state. Therefore, the inventor believed that the cause was the low dispersibility and low homogeneity of the droplets, and as a result of diligent and repeated studies, it was found that if a suitable material is selected or an appropriate surface treatment is applied, such a nozzle that a suitable length of capillary tubes or pores was collected can generate a sufficiently stable emulsion even against a solvent that cannot obtain an emulsion by a nozzle using a glass bead sintered plate.

It has been found that such a nozzle that the structure is an assembly of capillary tubes or pores, its material or surface treatment is appropriate, and the total length of the capillary tubes or thin pores is at least twice the inner diameter of the nozzle can stably spout droplets having high dispersibility and homogeneity even for an organic solvent such as polar solvents having greatly different physical properties from hydrocarbons. Because in the nozzle according to the present invention, coalescence of droplets is greatly suppressed as compared with a nozzle using a conventional glass bead sintered plate, it is possible to generate droplets adjusted to a shape closer to a sphere and having a well-defined size (higher homogeneity).

That is, the emulsion generating nozzle of the present invention is superior to the conventional nozzle in that it is effective for any kind of organic solvent forming the organic phase. However, when the total length of the capillary tube or the pore is less than twice the inner diameter, the running distance is often short. In other words, the flow velocity of the droplet in the capillary tube or the pore does not reach the flow velocity for immediately detaching from the tip of the capillary tube or the pore. In some cases, the droplets attached to the surface of the tip of the capillary tube or the pore remain long there, and grow large. In particular, the smaller the contact angle of the droplet of the organic solvent with the surface of the tip portion of the capillary tube or the fine pore (the easier it is to get wet), the larger the particle size of the droplet becomes. In consideration of the influence of the pressure loss, the total length is preferably 200 mm or less, but is not limited thereto.

On the other hand, when a fine solid component (particle component) is contained in the organic phase, if the port diameter (pore size) of the spouting port of the above-described glass bead sintered plate is at least 5 times the maximum particle size of the particle component, in the short term, clogging of the organic phase spouting nozzle by the particle component does not occur. However, due to long-term use (for example, several months), the particle component gradually accumulates in the nozzle, and the performance of spouting droplets decreases. Eventually, the clogging will occur, and it will not function as a nozzle for spouting droplets. The inventors have considered that the cause of long-term accumulation of particle components is the complexity and irregularity of the flow path of the bead sintered body. We have come up with a new liquid phase spouting nozzle that is effective as a new emulsion generating nozzle using a structure body in which capillary tubes or pores having simple and regular passages are assembled.

In the structure body in which capillary tubes or pores having a simple and regular flow path are assembled, accumulation of particle components is much less likely to occur than in a bead sintered body having a complicated and irregular passage. That is, unlike a bead sintered body in which the particle components gradually accumulate over a long period of use even if the diameter of the spouting port (pore size) is at least five times the maximum particle size of the particle component, even under the same conditions, it is possible to prevent the accumulation of particle components for a long period of time by using a structure body in which capillary tubes or pores are assembled.

Further, the capillary tube or the pore is preferably a straight line having no branch and has a constant inner diameter, but is not limited thereto. In case that the branches have a simple shape and smooth inner wall surface, or variation in an inner diameter of capillary tubes or pores is small or their curves are gentle, a similar effect can be obtained.

The nozzle of the present invention is an alternative to the organic phase spouting nozzle made of the bead sintered body. The nozzle structure in which capillary tubes or pores having an inner diameter of at least five times the maximum particle size of the particle component contained in the aqueous phase are assembled, and the tips have appropriate water repellency (hydrophobicity) functions also as a nozzle for spouting the aqueous phase.

As described above, an object of the present invention is to provide a nozzle for spouting a liquid phase, in which one liquid phase in a two-liquid phase system can be stably jetted as highly dispersible droplets while suppressing coalescence of droplets, and accumulation of fine solid components does not easily occur. In addition, from the viewpoint described above, the nozzle for spouting the liquid phase of the present invention has a structure in which two or more capillary tubes or pores are assembled at an arbitrary interval. The capillary tubes or pores have a total length of at least twice the inner diameter, and when the aqueous phase or the organic phase contains a particle component, has an inner diameter of at least five times the maximum particle diameter. Specifically, the nozzle according to the present invention has the following configuration.

The nozzle for spouting a liquid phase according to the present invention comprises at least one structure body in which a plurality of narrow tubes or pores that are open at both ends are provided, for spouting one liquid phase to the other liquid phase in a two-liquid phase system including an aqueous phase and an organic phase, wherein the two-liquid phases are brought into an emulsion state by spouting one liquid phase sucked from one end of said structure into the other liquid phase in the form of droplets from the other end of said structure body.

A nozzle for spouting a liquid phase according to another aspect of the present invention comprises a capillary tube or pore with an inner diameter of 0.5 mm or less, which spouts the liquid phase in a two-liquid phase system having an aqueous phase and an organic phase containing at least one of the particle components. Both ends of a suction end for sucking the liquid phase and a discharge end for releasing the sucked liquid phase are open. The capillary tubes or the pores, in which the total length of the cylindrical or tunnel-shaped portion between the openings is at least twice the inner diameter, and the inner diameter is at least five times the maximum particle diameter of the particle component, are assembled, and an emulsion state is formed by spouting the aqueous phase or organic phase containing particle components as droplets from the nozzle discharge end into the other liquid phase, resulting in an emulsion generated. The nozzle for jetting liquid phase is particularly useful in a two-liquid phase system containing a particle component because clogging hardly occurs.

A nozzle for spouting a liquid phase according to a further aspect of the present invention is installed in an aqueous phase or an organic phase in a two-liquid phase system consisting of the aqueous phase and the organic phase, said nozzle has a structure where a plurality of small tubes or pores are assembled, both ends of a suction end for sucking a liquid phase and a discharge end for releasing the sucked liquid phase are open, and the entire length of a tubular or tunnel-shaped portion having an inner diameter of 0.5 mm or less is at least twice as long as the inner diameter, and an emulsion state is formed by spouting the aqueous phase or the organic phase as droplets from the nozzle discharge end into the other liquid phase, resulting in an emulsion generated. This liquid phase spouting nozzle is particularly useful in a two-liquid phase system containing no particulate component.

Effects of the Invention

According to the present invention, it is possible to stably spout one liquid phase as highly dispersible droplets in a two-liquid phase system while suppressing coalescence between droplets, and the accumulation of fine solid components is reduced.

BRIEF DESCRIPTION OF THE SEVERAL DRAWINGS

FIG. 13 (B) is a schematic configuration diagram showing an example of a unit of a projecting capillary nozzle having a different capillary length and a shared container in which a plurality of units is installed.

FIG. 14 (B) is a schematic configuration diagram showing an example of a unit of a porous plate nozzle having a different pore length and a shared container provided with a plurality of units.

FIG. 16 (B) is a schematic configuration diagram showing an example in which a unit of a protruding capillary tube nozzle having different lengths of capillary tubes and the unit are installed at a branch destination of a liquid feeding pipe.

FIG. 17 (B) is a schematic configuration diagram showing an example in which a unit of a porous plate nozzle having different lengths of pores and the unit are installed at a branch of a liquid feeding pipe.

BEST MODE FOR CARRYING OUT THE INVENTION

Figure 1:
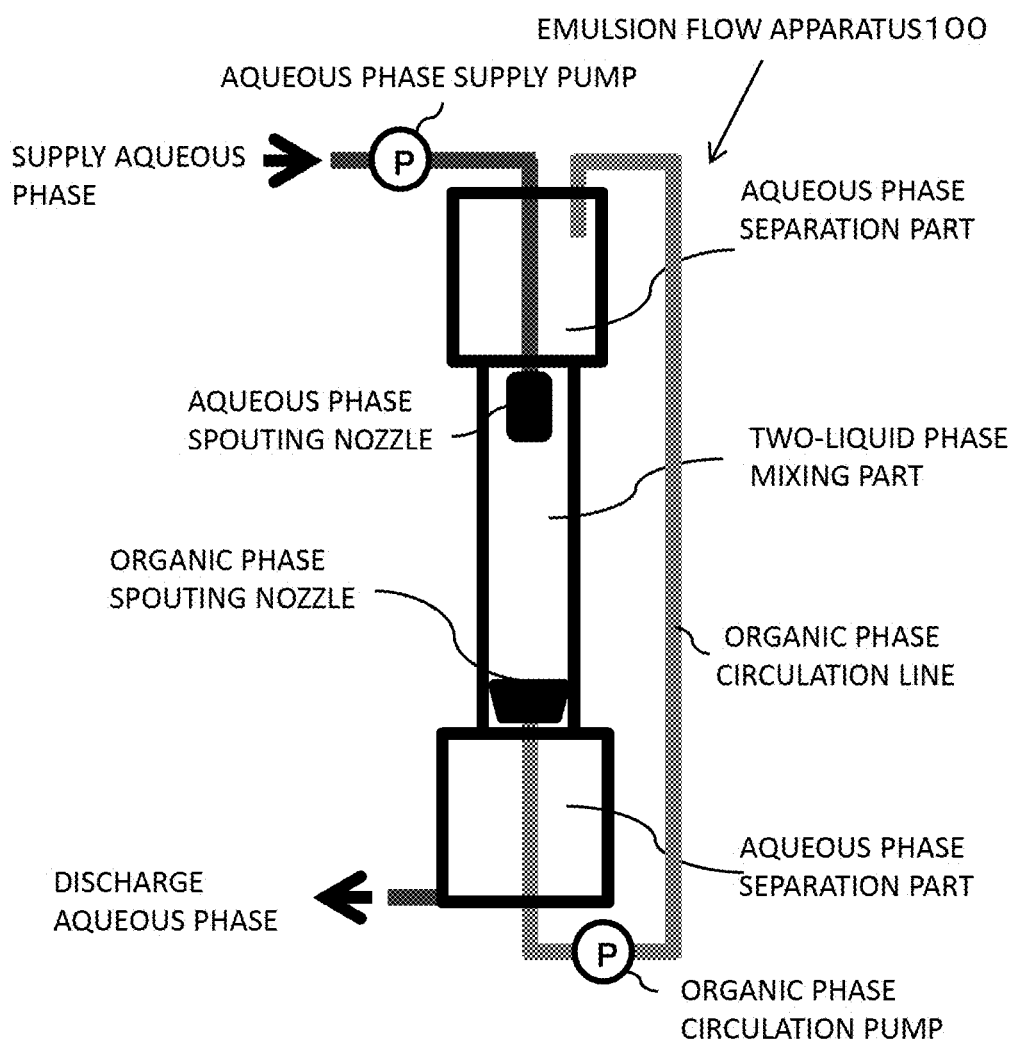
FIG. 1 is a schematic configuration diagram showing an example of a counter current emulsion flow apparatus.

Before describing the structure of the nozzle according to the present invention, a counter current type emulsion flow apparatus will be described with reference to FIG. 1 as an example to which such a nozzle is applied. FIG. 1 is a schematic configuration diagram of an example of an emulsion flow apparatus as disclosed in Patent Document 1.

In FIG. 1, the emulsion flow apparatus 100 includes: an aqueous phase spouting nozzle that spouts the aqueous phase, an organic phase spouting nozzle for spouting an organic phase, a two-liquid-phase mixing part in which a stream (referred to as an emulsion flow) composed of an aqueous mixed phase of an aqueous phase and an organic phase is generated, phase separation part installed above and below the two-liquid phase mixing part (upper organic phase separator and lower aqueous phase separator), an aqueous phase supply pump, and an organic phase circulation pump.

Next, the operation will be described. The aqueous phase is supplied to the aqueous phase spouting nozzle of the emulsion flow apparatus 100 by an aqueous phase supply pump provided in a pipe connecting the supply aqueous phase (aqueous solution) and the emulsion flow apparatus 100, and the aqueous phase is extracted into an organic phase as an extraction solvent. At the same time, the organic phase is jetted through the organic phase spouting nozzle of the apparatus 100 so as to face the flow of the aqueous solution. As a result, a flow (emulsion flow) composed of an emulsion mixed phase of an aqueous phase and an organic phase is generated in the two-liquid phase mixing part of the emulsion flow apparatus 100. When the emulsion flow reaches the organic phase separation part above the two-liquid phase mixing part and the aqueous phase separation part below the two-liquid phase mixing part, the state of the emulsion flow is released and the aqueous phase and the organic phase are separated. As a result, the organic phase gathers in the organic phase separation part, and the aqueous phase gathers in the aqueous phase separation part. The clean organic phase in the organic phase separation part is circulated through the organic phase circulation line. Further, the clean aqueous phase in the aqueous phase separation part is taken out as the discharge aqueous phase after the treatment.

The emulsion generation nozzle according to the present invention, which will be described in detail below, is used as the above-described aqueous phase spouting nozzle and/or the organic phase spouting nozzle. As examples of the emulsion generating nozzle of the present invention, a bundled capillary tube nozzle (FIG. 2), a projected capillary tube nozzle (FIG. 3), and a porous plate nozzle (FIG. 4) are shown. Note that the present invention is not limited to the examples shown in FIG. 2, FIG. 3, and FIG. 4. Each of these three types of nozzles has a structure in which a liquid feeding pipe is attached to a casing container that covers one end of a structure body in which capillary tubes or pores are assembled, and the other end is open. By forming the casing container, for example, to a shape inclined from the center to the outside, the liquid feeding force is evenly applied to each of the capillary tubes or pores, so that a change in the spouting strength of the liquid droplet can be suppressed.

Further, it is preferable that the discharge pressure of the pump is set as low as possible within a range in which droplets can be generated. If the pump discharge pressure becomes too large, the spouting of the liquid phase becomes jet flow, and the particle size distribution and shape of the droplet cannot be maintained properly. The optimum pump discharge pressure for spouting droplets greatly varies depending on the inner diameter of a capillary tube or a pore forming a nozzle, the physical properties (particularly, the viscosity) of a liquid phase to be discharged.

Figure 2A:
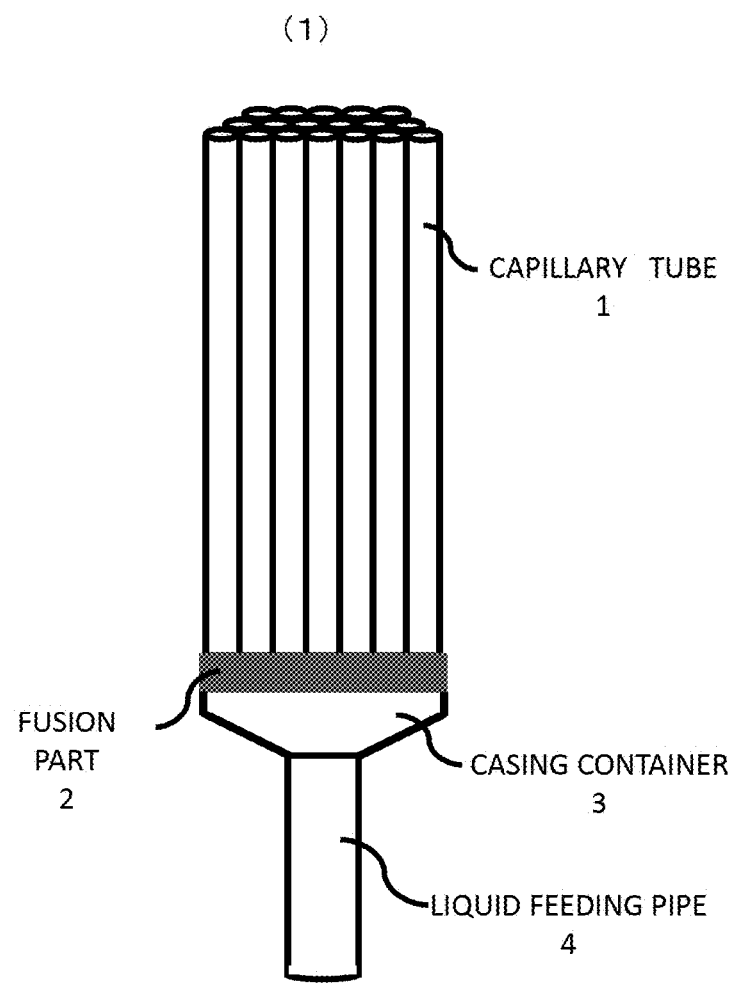
FIG. 2 is a schematic configuration diagram showing an example of a bundled capillary nozzle.
Figure 2B:
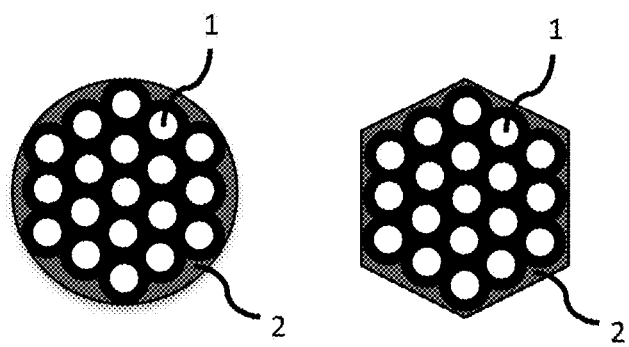
Figure 2B:
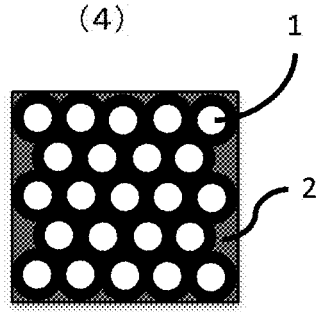
Figure 3A:
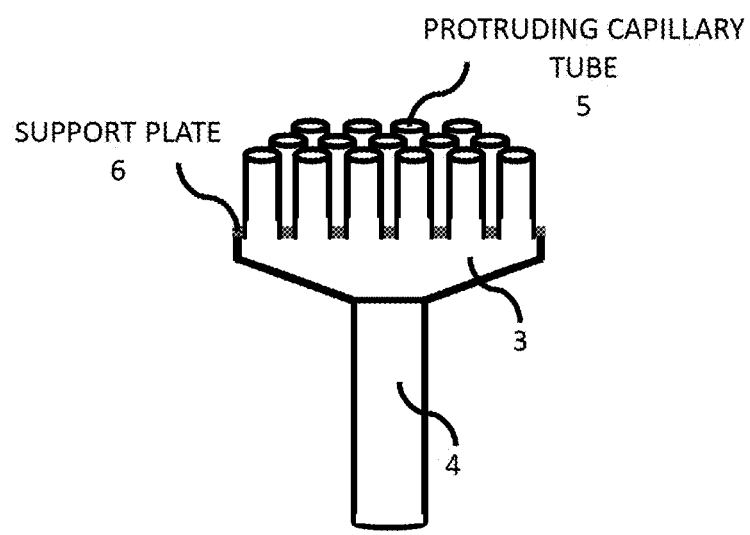
FIG. 3 is a schematic configuration diagram showing an example of a protruding capillary nozzle.
Figure 3B:
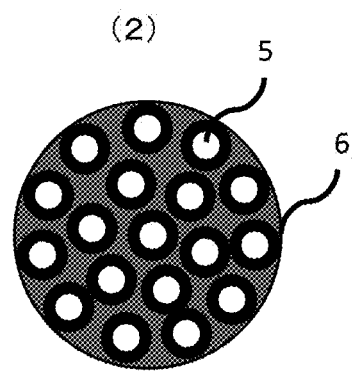
Figure 3B:
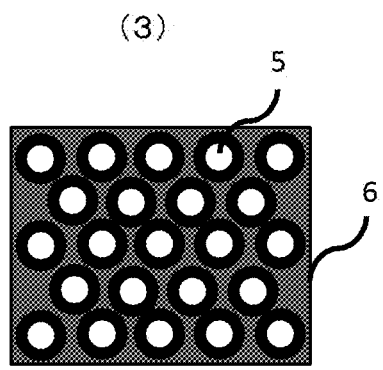
Figure 4A:
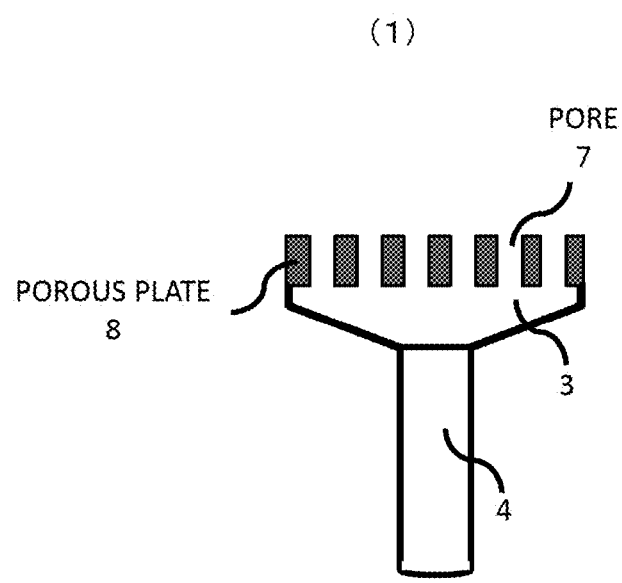
FIG. 4 is a schematic configuration diagram showing an example of a porous plate nozzle.
Figure 4B:
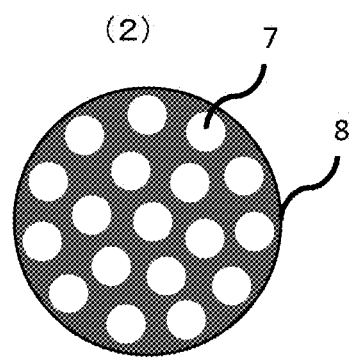
Figure 4B:
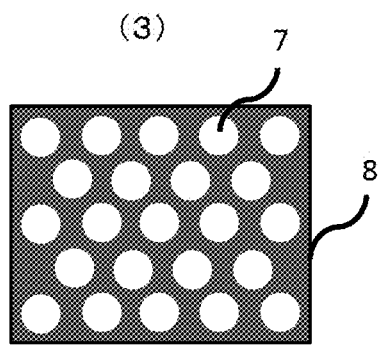

The bundled capillary tube nozzle shown in FIG. 2 has a structure in which capillary tubes are fused and bundled. The capillary tubes may be fused closely or may be bonded to each other at an arbitrary interval. The protruding nozzle shown in FIG. 3 has a structure in which the capillary tubes protruding through the support plate are arranged, and the capillary tubes may be arranged closely or may be provided to each other at an arbitrary interval. The porous plate nozzle shown in FIG. 4 has a structure in which a porous plate having a plurality of pores is installed, and the pores may be provided closely to each other or may be arranged at an arbitrary interval. FIGS. 2 to 4 show circular, square, or hexagonal shapes as an example of the shape of the spouting surface of the droplet, but the present invention is not limited to these examples. Further, the number of capillary tubes or pores is determined according to the size of the area of the droplet spouting surface. That is, as the area of the droplet spouting surface increases, the number of the capillary tubes or the pores also increases.

Further, in a structure body in which capillary tubes or fine pores are assembled, it is possible to change the position and timing of spouting of the droplets by mixing capillary tubes or pores having different total lengths. Thereby, the isolation of the droplets is improved, and the coalescence of the droplets can be suppressed. However, when the lengths of the capillary tubes or the pores are significantly different, the difference in pressure loss becomes large, and the spouting of droplets may be biased. From this viewpoint, it is preferable that the change in the length of the capillary tubes or the pore is kept to a necessary minimum.

Figure 5:
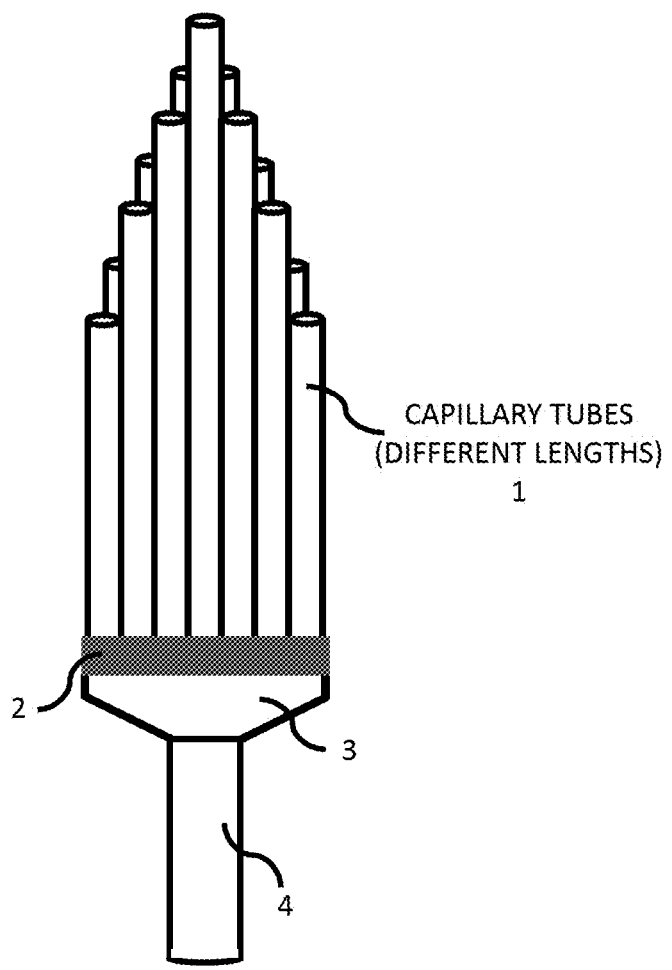
FIG. 5 is a schematic configuration diagram showing an example of a bundled capillary nozzle having a different capillary length.
Figure 6:
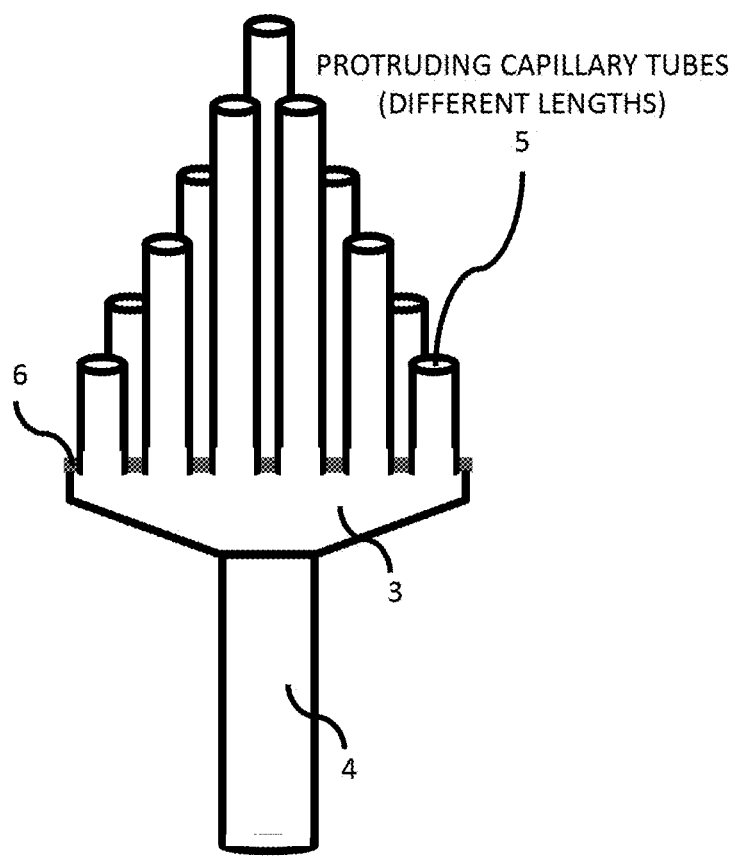
FIG. 6 is a schematic configuration diagram showing an example of a protruding capillary nozzle having different lengths of capillary tubes.
Figure 7:
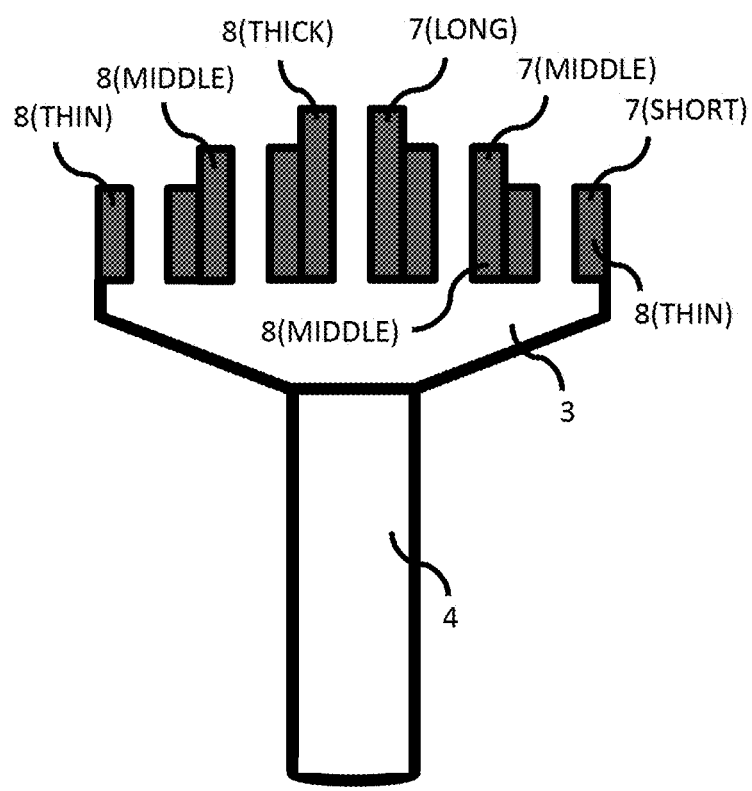
FIG. 7 is a schematic configuration diagram showing an example of a porous plate nozzle having different lengths of pores.

FIGS. 5 to 7 show examples of nozzles formed of a structure body in which capillary tubes or pores are assembled. In these nozzles, the length of the capillary tubes or pores protruding toward the open side of the structure body is not constant, and the capillary tubes or the pores having different total lengths are mixed, but the present invention is not limited thereto. Specifically, FIG. 5 shows an example of a bundled capillary nozzle having a different capillary length, FIG. 6 shows an example of a protruded capillary nozzle having a different capillary length, and FIG. 7 shows an example of a porous plate nozzle having different pore lengths.

Compared with a nozzle in which capillary tubes or pores are installed at an arbitrary distance, the nozzle in which the capillary tubes or the pores are in close contact with each other has an advantage that the liquid feeding amount per unit sectional area on the upper surface of the casing container can be increased. On the other hand, such a nozzle has a disadvantage that the droplets are likely to come into contact with each other and coalesce. Therefore, by installing a spacer for securing a distance between the capillary tubes in the case of a capillary tube nozzle, it is possible to suppress coalescence of droplets while maintaining the liquid feeding amount.

Figure 8:
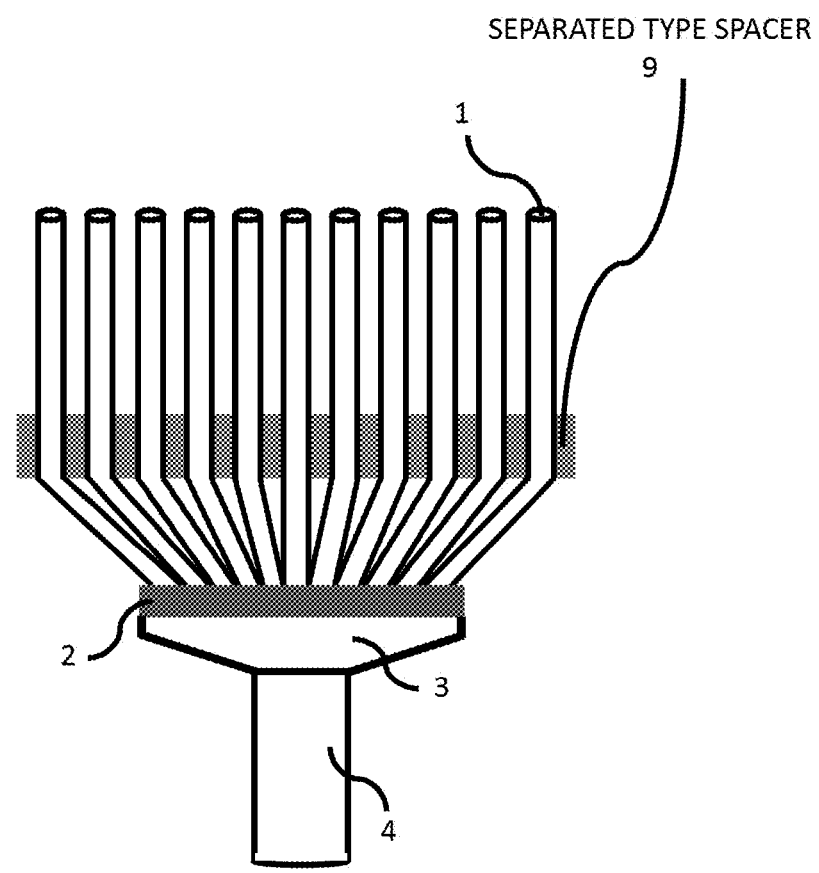
FIG. 8 is a schematic configuration diagram showing an example of a separated type spacer for a bundled capillary nozzle.

The spacer can be provided for both the bundled capillary nozzle and the protruding capillary nozzle. For example, the spacer used in the bundled capillary nozzle includes a separated type spacer separated from the fusion portion and an integrated type spacer coupled to the fusion portion. An example of the separated type spacer is shown in FIG. 8, but the present invention is not limited to this example. The separated type spacer can be easily manufactured using, for example, a perforated sheet or a mesh sheet, and has an advantage that the position of the spacer can be freely moved up and down according to the length of the capillary tube.

Figure 9:
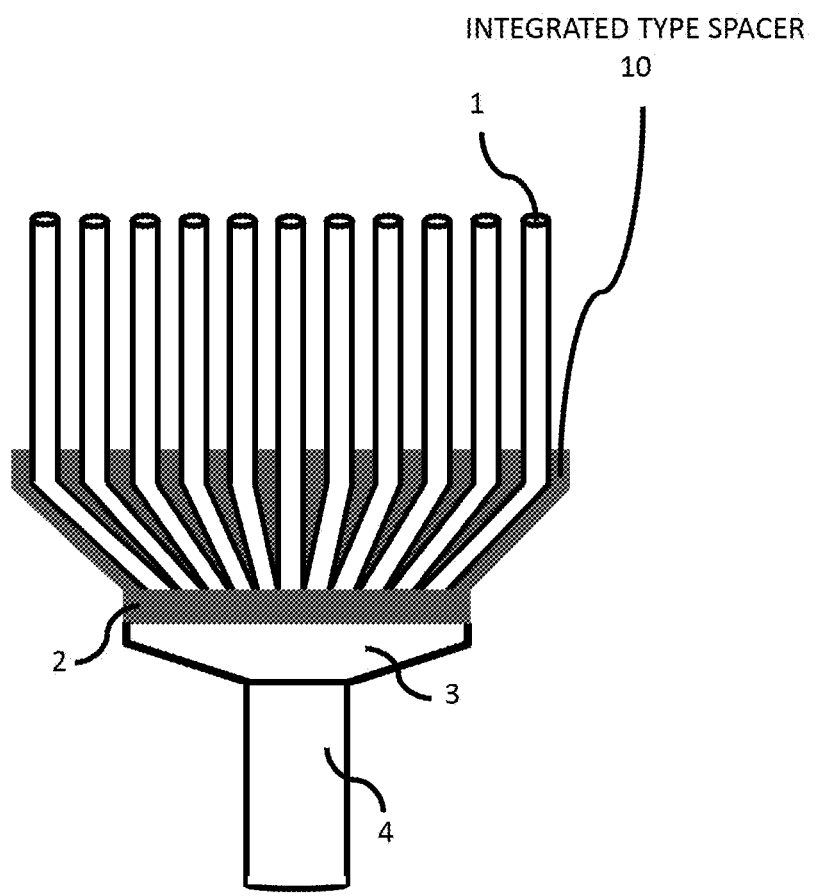
FIG. 9 is a schematic configuration diagram showing an example of an integrated spacer for a bundled capillary tube nozzle.

The separated type spacer has a drawback in that a gap in which dense capillary tubes are exposed is formed between the fusion portion and the spacer, and solid components and/or oil components are easily collected in the gap. On the other hand, the integrated type spacer fills gaps between the fused portions and the spacer, and integrates the fused portion and the spacer. An example of an integrated type spacer is shown in FIG. 9, but the present invention is not limited to this example. Since there is no gap between the fused portion and the spacer in the case of the integrated type spacer, the disadvantage of the separated type spacer is eliminated.

The spacer can also be used for a structure in which capillary tubes of different lengths are mixed. By making the lengths of the capillary tubes different, the effect of changing the position and timing of the spouting of the droplets and the effect of securing the distance between the capillary tubes by the spacer are also combined. Thereby, the isolation of the spouted droplets may be further improved.

Figure 10:
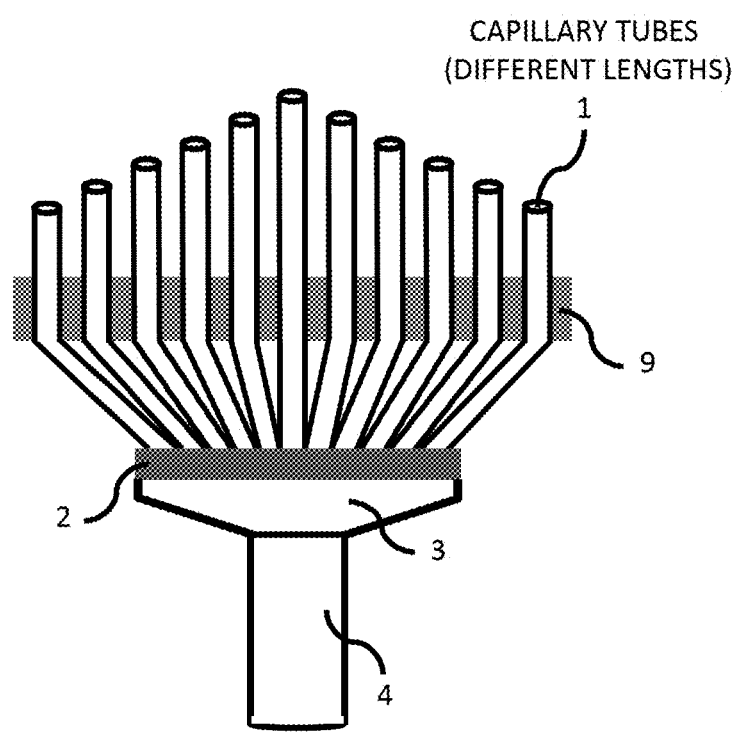
FIG. 10 is a schematic configuration diagram showing an example of a separated type spacer for a bundled capillary nozzle having different lengths of capillary tubes.
Figure 11:
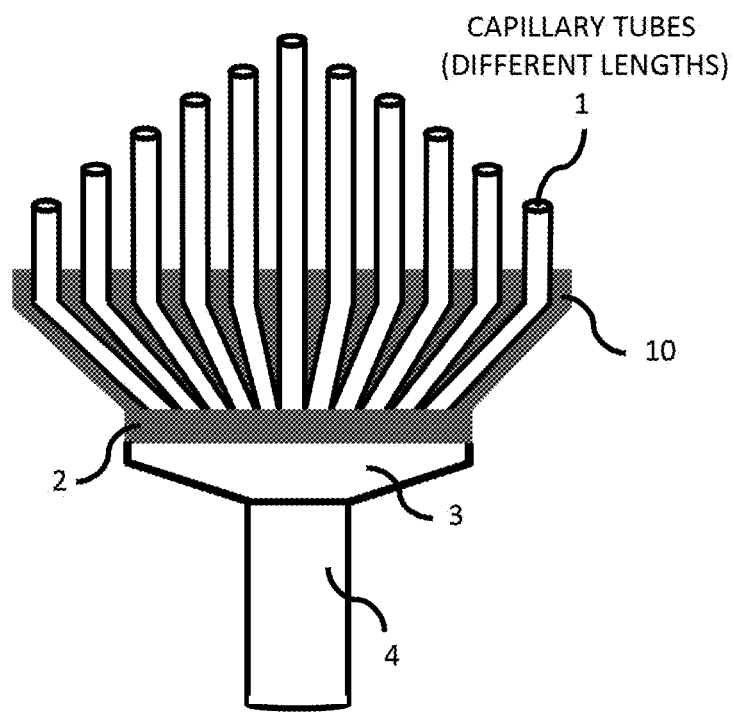
FIG. 11 is a schematic diagram showing an example of an integrated type spacer for a bundled capillary tube nozzle having different lengths of capillary tubes.

FIG. 10 shows an example of the separated type spacer when the length of capillary tubes is different, and FIG. 11 shows an example of the integrated type spacer. However, the present invention is not limited to these examples.

Scaling up the nozzle of the present invention becomes possible by increasing the number of capillary tubes or pores. However, the structure in which a relatively small number of capillary tubes or pores are assembled is regarded as one unit, and by combining a plurality of units, more efficient liquid feeding may be realized. This is because a sudden change in the inner diameter of the capillary tube or the pore when reaching the capillary tube or the pore from the liquid feeding pipe is reduced by passing through such a unit. That is, a rapid change in the linear velocity is reduced by a two-step inner diameter change, that is, a change in the inner diameter from the liquid feeding pipe to the unit and a change in the inner diameter from the unit to the capillary tube or pore. Also, if the nozzle is manufactured by combining such units, it is possible to easily cope with a change in specifications by changing the number of units, and it is not always necessary to replace the entire nozzle at the time of maintenance. For example, it is also possible to check the status of individual unit and replace only those parts where a problem is found.

Specifically, a structure body in which two or more capillary tubes or pores are assembled is used as one unit, and two or more units each including the same number or a different number of capillary tubes or pores are combined. The number of the capillary tubes or the pores constituting the unit is determined according to the size of the area of the droplet spouting surface and the number of units to be installed.

Figure 12:
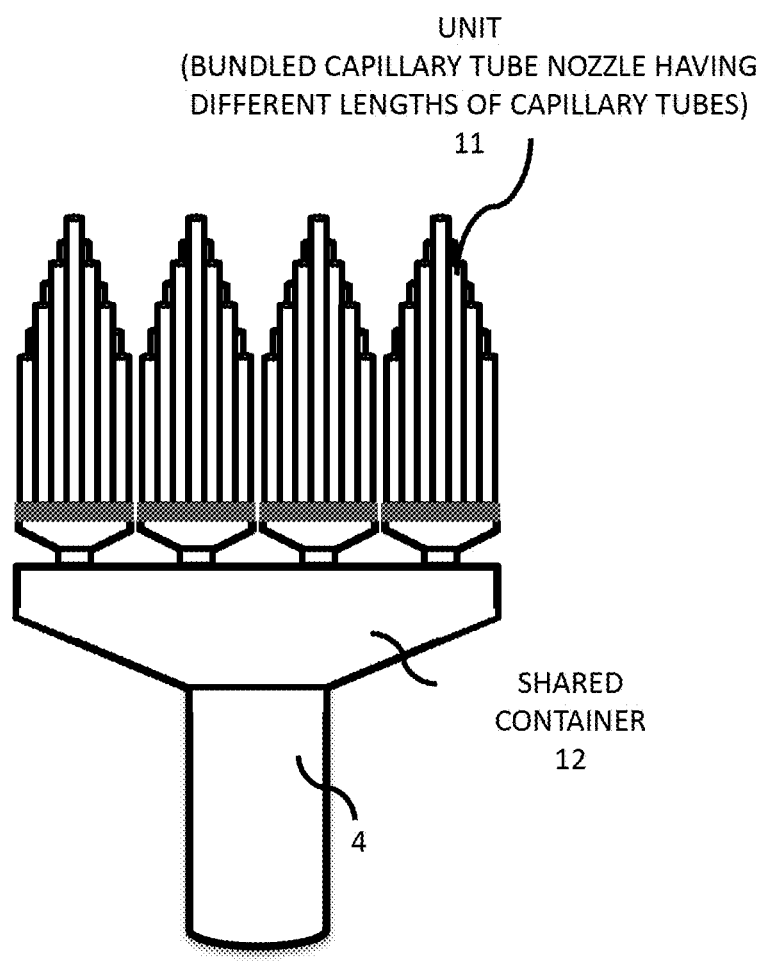
FIG. 12 is a schematic configuration diagram showing an example of a unit of a bundled capillary tube nozzle having different lengths of capillary tubes and a shared container in which a plurality of units is installed.
Figure 13A:
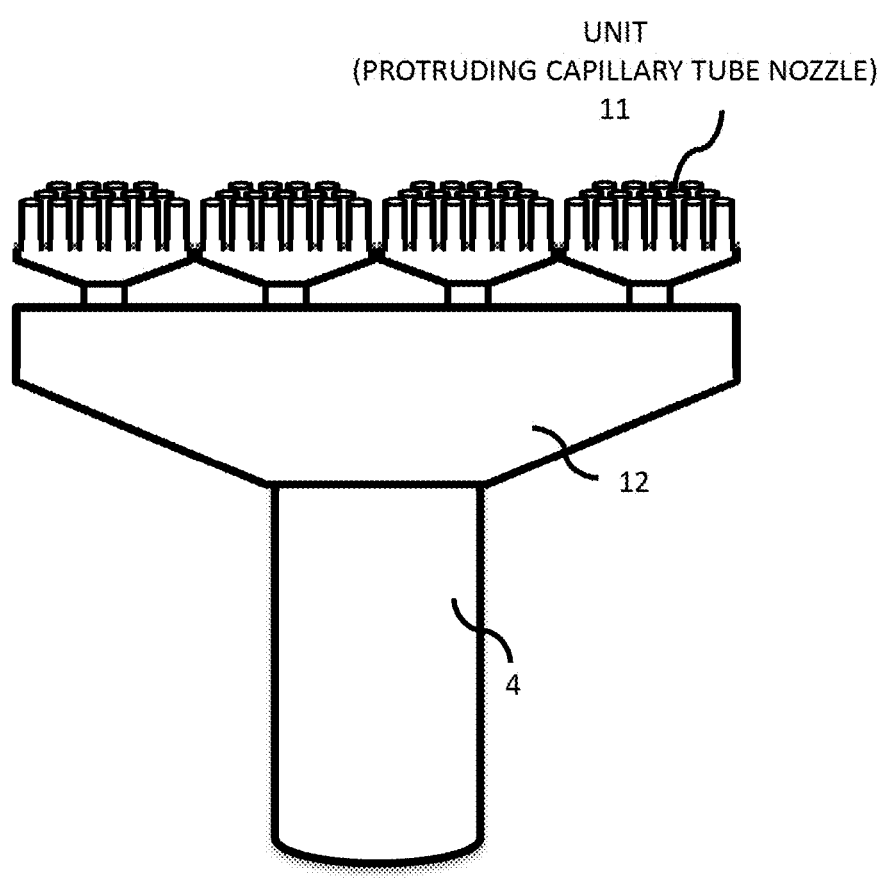
FIG. 13 (A) is a schematic configuration diagram showing an example of a unit of a projecting capillary tube nozzle and a shared container in which a plurality of units is installed.
Figure 13B:
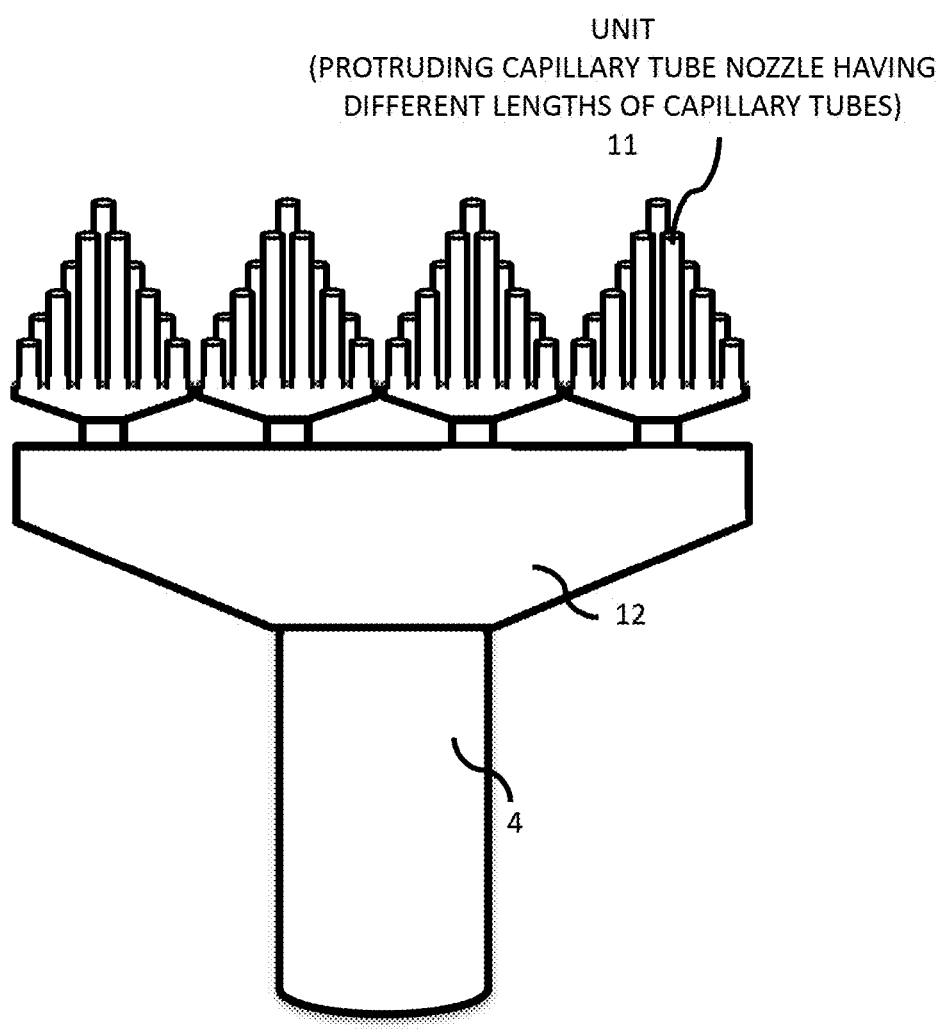

Further, as a nozzle structure having a plurality of units, for example, there is a method of installing a plurality of units so as to share one container. The shared container is provided with a liquid feeding pipe, and its pipe functions also as a nozzle. Specific examples are shown in FIGS. 12, 13 (A), 13 (B), 14 (A), and 14 (B), but the present invention is not limited to these examples.

Figure 15:
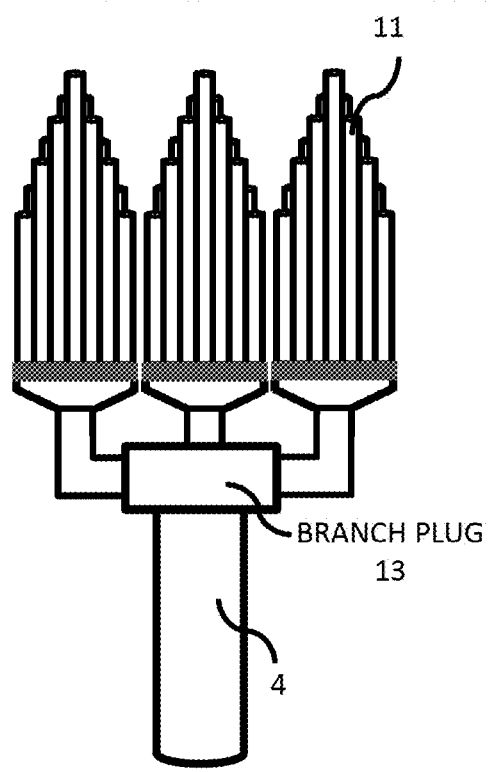
FIG. 15 is a schematic configuration diagram showing an example in which a unit of a bundled capillary nozzle having different lengths of capillary tubes and the unit are installed at a branch destination of a liquid feeding pipe.
Figure 16A:
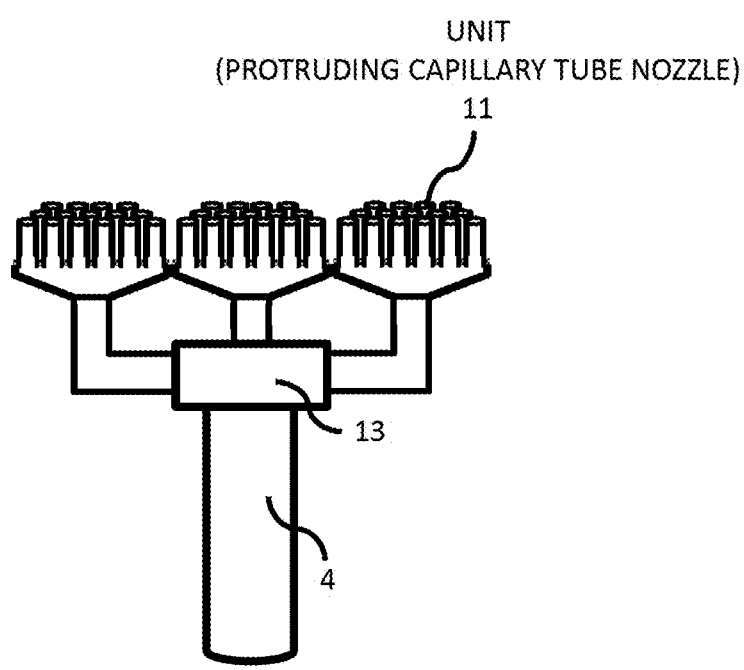
FIG. 16 (A) is a schematic configuration diagram showing an example in which the unit of the protruding capillary tube nozzle and the unit are installed at the branch destination of the liquid feeding pipe.

In addition to the above, there is also a way in which a liquid feeding pipe is branched into two or more tubes and the unit is installed at each branch destination as a nozzle structure having a plurality of units. Specific examples are shown in FIGS. 15, 16 (A), 16 (B), 17 (A), and 17 (B), but are not limited thereto.

With regard to materials for the nozzle droplet spouting part, in order to achieve a stable emulsion state, selection of suitable materials for the solvent and/or appropriate surface treatment is required, taking not only hydrocarbon solvents, but also highly polar solvents such as alcohols and ketones.

In other words, by using an organic-phobic material for the organic phase spouting nozzle and a hydrophobic material for the aqueous phase spouting nozzle as the material of the capillary tubes or pores forming the nozzle, droplets of the organic phase or aqueous phase are spouted. The droplets can be spouted while suppressing the coalescence of the droplets at the time of performing. The term "organophobic"

is an antonym for "organophilicity" and is the same as "hydrophobic" for hydrophilicity. In addition, organophobic is a word corresponding to oil repellency (oil repelling property) to kerosene, etc.

Further, it is not always necessary to use an organophobic or hydrophobic material for the entire capillary or pore, the effect of suppressing coalescence of droplets can also be obtained by applying organophobic treatment or hydrophobic treatment on the surface of the tip of the capillary tube or the pore.

Embodiment 1

Effect of Accumulation of Fine Solid Components

The effects of the accumulation of fine solid components will be specifically described below with reference to examples, but the present invention is not limited to the following examples.

Using the nozzle shown in FIG. 8 which is an example of the present invention, an experiment was conducted on the effect of accumulation of fine solid components. Here, as an organic phase spouting nozzle for an emulsion flow apparatus (apparatus volume 2 L, its weight 1.5 kg) having the structure and mechanism shown in FIG. 1, the nozzle shown in FIG. 8 was used in place of the conventional nozzle using a glass bead sintered plate. The contents and results of the experiment are shown below.

The nozzle of the present invention shown in FIG. 8 used in the experiment was manufactured by fusing 200 pieces of the capillary tubes made of fluororesin. In addition, the inner diameter of the capillary tube was 0.2 mm, and the length was 50 mm. The spacers were made by making holes in a resin plate. On the other hand, as the aqueous phase spouting nozzle, a polypropylene nozzle having ten ports each having a diameter of 1 mm was used around a cylinder having one end closed as in the prior art.

As the aqueous phase, an aqueous nitric acid solution (pH 2) in which aluminum oxide fine powder was suspended was prepared, and as the organic phase, D70 (trade name: D70) which is one of alkane solvents was prepared. The aluminum oxide fine powder was prepared by drying a commercial product in a desiccator containing phosphorus pentoxide overnight, and then classifying.

Specifically, classification was performed using two types of stainless steel sieves having openings of 0.025 mm and 0.045 mm. First, aluminum oxide fine particles having a particle size exceeding 0.045 mm were removed (remained on the sieve) using a sieve having an opening of 0.045 mm, and fine particles that passed through the sieve were collected. Further, using a sieve having an opening of 0.025 mm, aluminum oxide fine particles having a particle size of 0.025 mm or less were removed (pass through the sieve), and only a size of 0.025 mm or more and 0.045 mm or less was classified (The fine particles remaining on the sieve were collected).

At the start of the experiment, an aqueous nitric acid solution (pH 2) as an aqueous phase and D70 as an organic phase were charged into an emulsion flow apparatus. The aqueous phase filled at the start of the experiment is, so to speak, a blank solution, which is an aqueous solution containing no aluminum oxide fine powder. Both liquid phases were filled so that the liquid-liquid interface was located at the center of the two-liquid phase mixing part. The organic phase was filled so that the tip of the liquid suction port located above the organic phase circulation liquid feeding line was immersed in a length of 10 mm or more, and a certain amount of air layer was provided above the apparatus.

On the other hand, a container filled with an aqueous nitric acid solution containing aluminum oxide fine powder to be treated was separately prepared, and connected to a pump (aqueous phase supply pump) for supplying an aqueous phase to the emulsion flow apparatus. The organic phase was connected to a pump (organic phase circulation pump) so as to circulate inside the apparatus without being supplied from outside. A commercially available diaphragm pump or peristaltic pump was used as the liquid feeding pump, but the same type of pump was used for sending the aqueous phase and the organic phase (the diaphragm pump and the peristaltic pump were not mixed).

During the experiment, both the aqueous phase and the organic phase were fed at a rate of 10 L/hour. With the above-mentioned piping, the aqueous phase was discharged in a once-through way, while the organic phase was circulated in the apparatus. After the entire treatment of the aqueous phase (aqueous nitric acid solution containing fine aluminum oxide powder), the fine aluminum oxide powder adhering to the vessel walls in the apparatus was removed using a piston.

The above experiment was repeated twice a week for three months. The nozzle was never washed in the meantime, but the performance of the nozzle did not deteriorate, the clogging did not occur, and the nozzle could be used stably. After the nozzle durability test for three months was completed, the nozzle was weighed, and the mass of the nozzle was compared before and after use. As a result, no change in mass was observed.

As described above, as a result of conducting a long-term experiment using fine particles of aluminum oxide having a particle diameter of 0.045 mm or less and using a nozzle having an inner diameter of a capillary tube of 0.2 mm, the accumulation of fine aluminum oxide particles did not occur in the nozzle. It is known that solid components with a larger particle size are more likely to accumulate in the nozzle. In this embodiment, the inner diameter of the capillary tube of 0.2 mm was about 4.4 times the maximum particle size of 0.045 mm. Therefore, in order to prevent the solid components from accumulating in the nozzle, the inner diameter of the capillary tube may be set to be at least 5 times the maximum particle size of the solid components with some margin. The same can be considered for the pores.

Further, the results of experiments performed using not only the nozzle shown in FIG. 8 but also the nozzle of the present invention described above are summarized below. First, the effects of the accumulation of fine solid components on the bundled capillary nozzle shown in FIG. 8, the protruding capillary nozzle shown in FIG. 3, and the porous plate nozzle shown in FIG. 4 are compared. As a result, no difference was seen. In the case where a plurality of units are installed through a shared container having a liquid feeding pipe attached (FIGS. 12, 13 (A) and 14 (A)), or in the case where a plurality of units are installed at a point where the liquid feeding pipe is branched (FIGS. 15, 16 (A) and 17 (A)), no significant difference was observed between the bundled nozzle and the projecting capillary tube and the perforated plate nozzle.

In the bundled capillary tube nozzle using a spacer to keep the interval between the capillary tubes, when the spacer is separated from the fusion portion as shown in FIG. 8, a small amount of solid component or oil component adhered to the back surface of the spacer, etc. However, this problem was solved by integrating the spacer and the fused portion as shown in FIG. 9.

Comparative Example 1

Comparison with Nozzle Using Glass Bead Sintered Plate

The nozzle of the present invention and the nozzle using the glass bead sintered plate were compared under the same conditions as those in Embodiment 1 except for the use of the organic phase spouting nozzle. Specifically, a nozzle using a glass bead sintered plate having an average pore diameter (pore size) of 0.2 mm was compared with the result of the nozzle of Embodiment 1 shown in FIG. 8.

As a result, the spouting performance of the droplet gradually decreased, and a clear change appeared after three months. That is, the spouting amount of the droplets decreased, and the spouting was changed to sparse spouting due to partial blockage. After the endurance test for three months was completed, the nozzle was weighed, and the mass of the nozzle before and after use was compared. As a result, the mass increased after use.

Embodiment 2

Effects of Different Types of Organic Solvents

The effect of the difference in the type of the organic solvent will be specifically described below with reference to embodiment, but the present invention is not limited to the following embodiment.

Using the same emulsion flow apparatus as in Example 1, an experiment was conducted on the effect of the type of organic solvent onto the state of emulsion of the organic phase and the aqueous phase. Further, similarly to the first embodiment, an experiment was performed mainly using the nozzle of the present invention having the structure shown in FIG. 8. At this time, an appropriate material or a surface-treated material that exhibits sufficient organophobic (the property of keeping the organic solvent away) for each organic solvent was used for the capillary tube.

Pure water was used as the aqueous phase, and a pure solvent of an organic solvent was used as the organic phase. The experiment was conducted by selecting hydrocarbons (isooctane, D70, and benzene), alcohols (1-octanol), ketones (4-methyl-2-pentanone), amines (n-trioctylamine), phosphate esters (tributyl phosphate), and halogenated hydrocarbons (dichloromethane) as the organic solvent.

Table 1 shows the state of emulsion of various organic phases (pure solvents) and aqueous phases (pure water) in the emulsion flow apparatus. Table 1 collectively shows the experimental results obtained by using the nozzle shown in FIG. 8 (the present invention) and the glass sintered plate nozzle (the conventional nozzle) for comparison.

TABLE 1

| Organic phase | Glass sintered plate nozzle | Nozzle in FIG. 8 |
|---|---|---|
| isooctane | ○ | ○ |
| D70(Alkanes) | ○ | ○ |
| benzene | ○ | ○ |
| toluene | ○ | ○ |
| 1-octanol | x | ○ |
| 4-methyl-2-pentanone | Δ | ○ |

TABLE 1-continued

| Organic phase | Glass sintered plate nozzle | Nozzle in FIG. 8 |
| --- | --- | --- |
| n-trioctylamine | Δ | ○ |
| tributyl phosphate | Δ | ○ |
| dichloromethane | Δ | ○ |

○: Good emulsion overall
Δ: Good emulsion partially
x: Does not reach the state of emulsion As shown in Table 1, by using a capillary tube selected for a suitable material or surface treatment for the nozzle shown in FIG. 8, a good (highly dispersible) emulsion was able to be stably formed throughout in a proper position (two-liquid phase mixing part) of the emulsion flow apparatus for all organic solvents described above.

Depending on the type of organic solvent, it may be difficult to find a suitable capillary material, in which case surface treatment is effective. For example, it is possible to reduce the particle size of the droplets generated to about half by performing an appropriate surface treatment to increase the organic phobicity on the tip of the capillary tube.

Further, in order to investigate the influence of the difference in the types of organic solvents, the bundle thin tube nozzle shown in FIG. 8, the protruding thin tube nozzle shown in FIG. 3, and the pore plate nozzle shown in FIG. 4 were compared. As a result, no significant difference was observed. In the case where a plurality of units are installed through a shared container to which a liquid feeding pipe is attached (FIGS. 12, 13 (A) and 14 (A)) or in the case where a plurality of units are installed at a point where the liquid feeding pipe is branched (FIGS. 15, 16 (A) and 17 (A)), no significant difference was observed between the bundled capillary tube nozzle, the protruding capillary nozzle and the perforated plate nozzle.

Figure 14A:
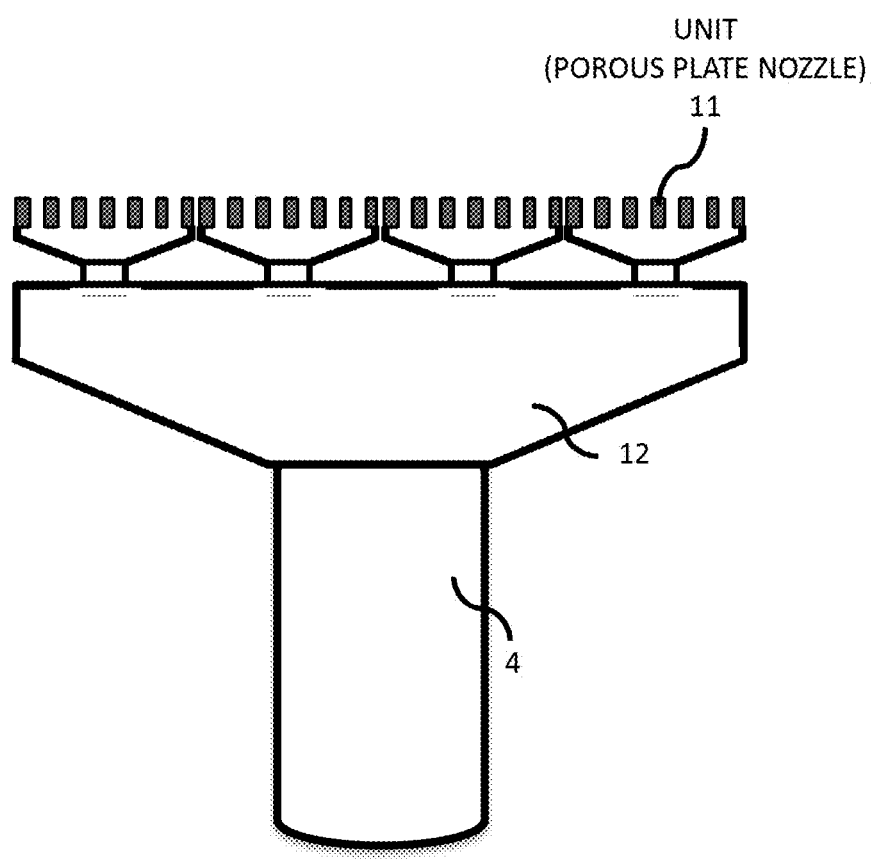
FIG. 14 (A) is a schematic configuration diagram showing an example of a unit of a porous plate nozzle and a shared container in which a plurality of units is installed.
Figure 14B:
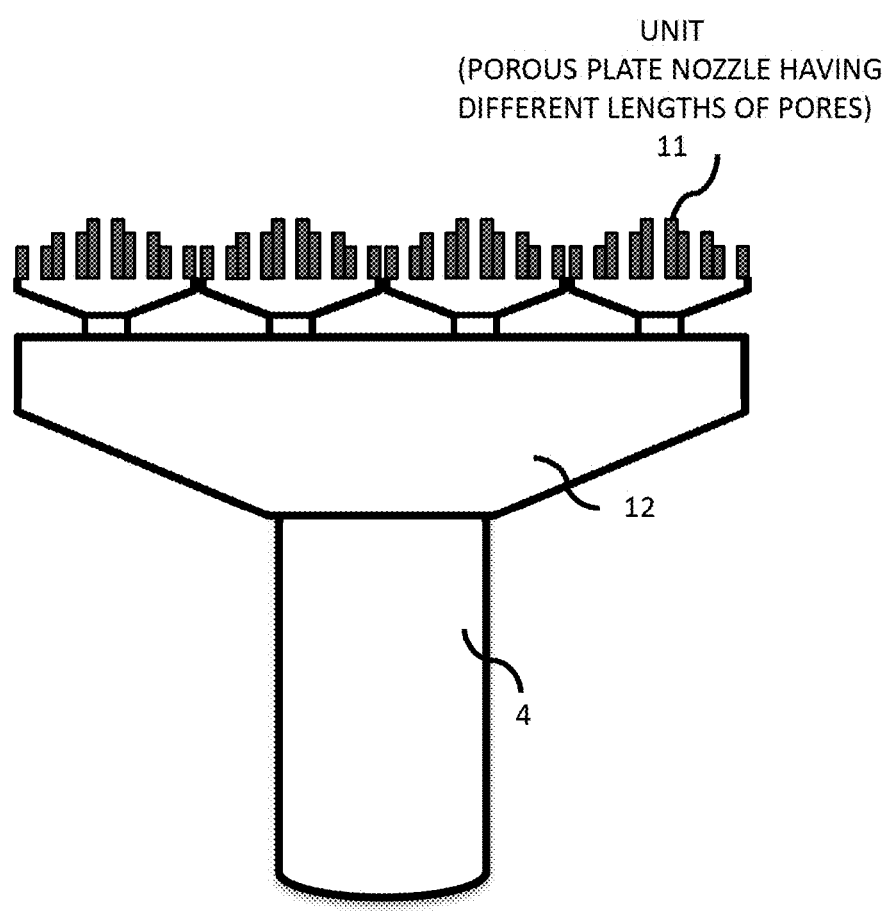
Figure 16B:
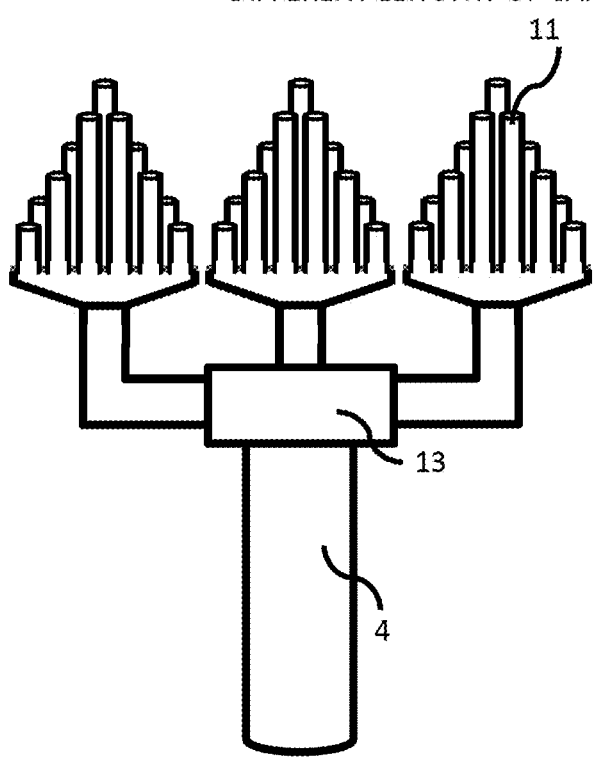
Figure 17A:
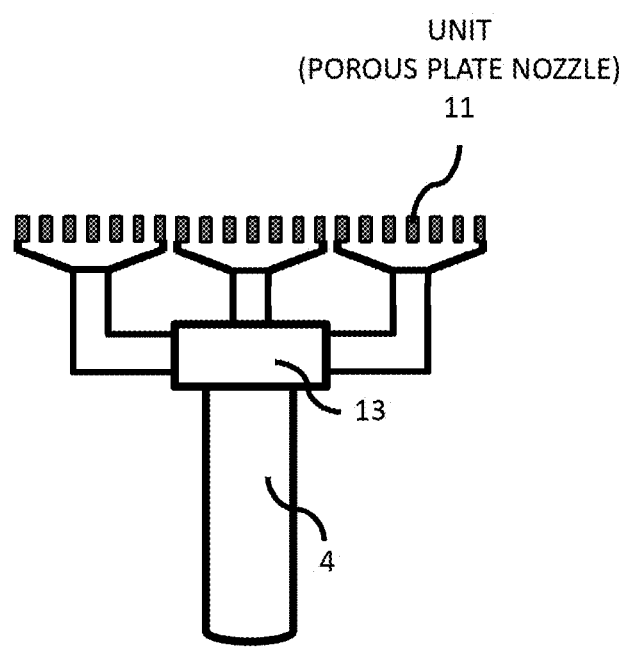
FIG. 17 (A) is a schematic configuration diagram showing an example in which a unit of a porous plate nozzle and the unit are installed at a branch destination of a liquid feeding pipe.
Figure 17B:
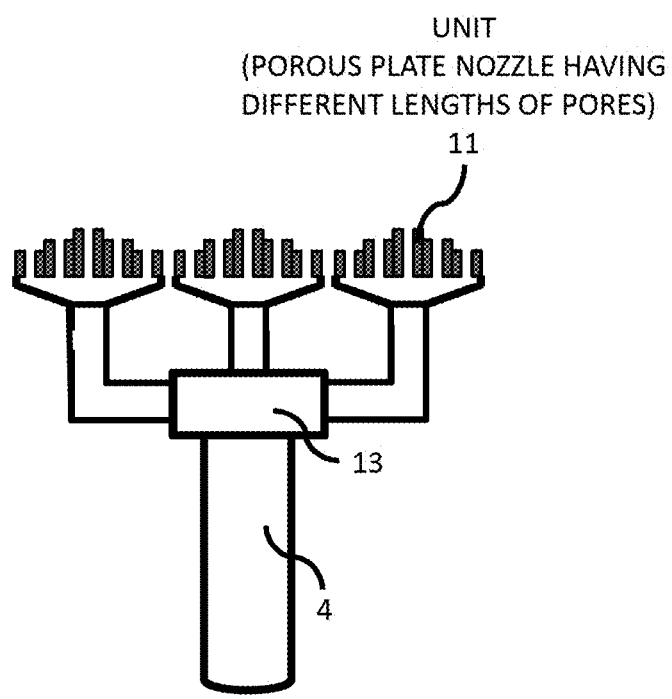

In the nozzle in which the narrow tubes or pores having different total lengths are mixed, as shown in FIG. 5, FIG. 6, FIG. 7, FIG. 10, FIG. 11, FIG. 12, FIG. 13 (B), FIG. 14 (B), FIG. 15, FIG. 16(B), and FIG. 17(B), the spouting position and the spouting timing of the droplets are different, so that compared to the case where the total length of the capillary tubes or pores is constant, an emulsion state (emulsion) could be maintained more stably in some cases.

Further, in the bundled capillary nozzle, depending on whether or not the spacer is provided, a large difference may occur in the range of the emulsion state (emulsion) and the stability of the emulsion. That is, the nozzles shown in FIG. 8 to FIG. 11 may generate an emulsion more stably in a wider range than the nozzles shown in FIG. 2 and FIG. 5.

Comparative Example 2

Comparison with Nozzles Using a Glass Bead Sintered Plate

The nozzle of the present invention and the nozzle using the glass bead sintered plate were compared under the same conditions as those in Example 2 except for the difference of the organic phase spouting nozzle. Specifically, a nozzle using a glass bead sintered plate having an average pore diameter (pore size) of 0.1 mm was compared with the nozzle shown in FIG. 8.

As a result, as shown in Table 1, for the nozzle using the glass bead sintered plate, a good (highly dispersible) emulsion state can be obtained as a whole in the two-liquid phase mixing part of the emulsion flow apparatus only when the organic solvents were hydrocarbons. With respect to other organic solvents, a partially good (highly dispersible) emulsion state was not able to be obtained, or even an emulsion state was not able to be obtained. That is, it did not work as a nozzle for generating an emulsion.

Embodiment 3

Effect of Total Length of Capillary Tubes or Pores on Droplet Size

A plurality of thin tubes made of fluororesin having an inner diameter of 0.5 mm, of which length is different between 0.7 to 2 mm are were prepared. Using a peristaltic pump, D70, which is one of the alkane-based solvents, was sent into water at the same flow rate, and the particle size of the generated droplets was measured. It has been found that even if the inner diameter of the capillary tube is the same and further the liquid is sent under the same condition using the same pump, the particle diameter of the generated droplet may be varied by changing the total length of the capillary tube.

Specifically, when the total length of the capillary tube (inner diameter 0.5 mm) is less than 1 mm, it is difficult for the droplet to separate from the tip portion of the capillary tube, and the droplet stays at the tip portion for a long time and grows greatly. This phenomenon is considered to be caused by the reason that the in-tube flow velocity does not reach such a speed that the liquid droplet could immediately leave the tip portion of the capillary tube by a shortage of the run-up distance of D70 passing through the capillary tube. That is, in order to prevent the droplet from staying long at the tip of the thin tube, a sufficient total length is required for the inner diameter of the thin tube. In this embodiment, the total length of the thin tube is required to be twice or more the inner diameter (the total length was 1 mm or more with respect to the inner diameter of 0.5 mm). Even if the inner diameter of the thin tube is less than 0.5 mm, it is considered that the total length of the thin tube requires more than twice the inner diameter for the same reason (insufficient approach distance, etc.). The same applies not only to thin tubes but also to pores. It was also found that the smaller the contact angle of the droplet of the organic phase with the surface of the tip portion of the capillary or the fine pore (the easier it is to wet), the larger the particle size of the droplet.

That is, it was found that the limit of the length (total length) of the capillary or the pore differs depending on the type of the solvent constituting the organic phase and the surface material of the capillary or the pore constituting the nozzle.

Embodiment 4

Effects of Pump Discharge Pressure and Contact Angle on Droplet Size

Using a fluororesin capillary tube having an inner diameter of 0.2 mm and a total length of 20 mm, by sending D70 into water with a peristaltic pump, the effects of pump discharge pressure and contact angle on the droplet size of D70 were investigated. As a result, it was found that it is preferable to set the discharge pressure of the pump as low as possible within a range where droplets are generated. If the pump discharge pressure is too high, the spouting of the liquid phase becomes jet, and it is not possible to maintain an appropriate droplet size distribution and shape. In order to generate good liquid droplets, it is necessary to set the discharge pressure of the pump in consideration of the inner diameter of the capillary tube or pore forming the nozzle, the viscosity of the liquid phase, and the like. For example, a liquid phase having a higher viscosity required a larger pump discharge pressure to obtain an appropriate droplet size distribution and shape.

It was found that the size of the contact angle (in this case, the contact angle defined by a three-phase system consisting of a solid surface and two liquid phases) between the solid surface and the liquid phase at the tip of the nozzle was a more important factor than the pump discharge pressure as an effect on the droplet size. Specifically, with respect to a fluororesin capillary tube having an inner diameter of 0.2 mm and a total length of 20 mm, the droplet diameter when D70 was spouted was compared between a hydrophilic processed (with improved organophobic and increased contact angle) and a non-hydrophilic processed. In the case of the hydrophilic processing, the droplet diameter was about half that of the non-hydrophilic processing. Similarly, when the same hydrophilically processed fluororesin tubule is used for jetting the aqueous phase, the droplet size of the aqueous phase (pure water) became about twice that of the non-hydrophilically processed type (fluororesin with unique high water repellency).

That is, when the contact angle is large (hard to wet), the "drop of the droplet" from the nozzle tip is improved as compared with the case where the contact angle is small (easy to wet). Further, the particle diameter of the droplet was closer to the inner diameter of the capillary or the pore, and a droplet having a smaller variation and a more uniform shape was generated. Namely, in order to generate droplets with a sufficiently small particle size, high water repellency (hydrophobic) was required for the aqueous phase spouting nozzle, and high oil repellency (organophobic) was required for the organic phase spouting nozzle.

The present invention provides, for example, an aqueous phase spouting nozzle and/or an organic phase spouting nozzle, which is provided for the purpose of emulsifying and mixing an aqueous phase and an organic phase, as one component forming an emulsion flow apparatus used for liquid-liquid extraction or the like. On the other hand, the nozzle of the present invention cannot be used as a nozzle in a liquid-liquid extraction apparatus (for example, a spray column) which does not like the occurrence of an emulsion state (emulsion). The parts of the present invention are not limited to the emulsion flow apparatus, and it can be used as a nozzle in all of the apparatuses and mechanisms for mixing the liquid phases to an emulsion state (emulsion) using the spouting of droplets are used for emulsion generation.

The emulsion generating nozzle of the present invention has two advantages in industrial use as compared with a conventional nozzle using a bead sintered plate.

One feature is that emulsion of an organic phase and an aqueous phase can be performed with highly polar organic solvents such as alcohols, and ketones, etc. not limited to hydrocarbons, and an emulsion can be generated. A nozzle using a conventional glass bead sintered plate works effectively for spouting droplets of hydrocarbons, but is not always effective for highly polar solvents such as alcohols and ketones. In many cases, the emulsion does not reach a stable emulsion state.

On the other hand, in the nozzle according to the present invention in which capillary tubes or pores with an appropriate length are assembled, if an appropriate material is selected, or an appropriate surface treatment is performed, a sufficiently stable emulsion can be generated even with a solvent that does not lead to an emulsion with a nozzle using the bead sintered plate. For example, it is effective for the organic solvent which cannot be dealt with by the conventional nozzle for generating an emulsion, particularly for a polar organic solvent. Therefore, such a nozzle is effective when is used as a droplet spouting part of the emulsion flow apparatus, and its industrial applicability would further expand.

The nozzle of the present invention is further characterized in that a phenomenon in which a fine solid component (particle component) gradually accumulates in the nozzle over a long period of use can be avoided. In a nozzle using a conventional bead sintered plate, the flow path structure inside the sintered plate is complicated and irregular, so that fine particle components are easily captured in the structure inside the flow path, and a part thereof remains without flowing out, the accumulation progresses, and eventually the nozzle does not function.

On the other hand, in the liquid-phase spouting nozzle of the present invention having a structure in which capillary tubes or pores having simple and regular flow paths are assembled, the accumulation of particle components is less likely to occur, compared to a bead sintered plate. In other words, over a long period of time, since it is possible to prevent the accumulation of fine particle components, compared with conventional nozzles, in that it can be used for a longer period and more stably, for example, if it is used as a component of an emulsion flow apparatus, its industrial applicability is expected to expand further.

What is claimed is:

1. A nozzle for spouting a liquid phase, comprising a structure in which a plurality of capillary tubes or pores, each having a suction end for sucking in a liquid phase and a discharge end for releasing the sucked liquid phase, are assembled, wherein the capillary tubes or pores include a plurality of different lengths that are mixed in the structure.

2. The nozzle for spouting a liquid phase according to claim 1, wherein the structure includes a casing container that covers the entire suction end, and a liquid feeding pipe for feeding the liquid phase is attached to the casing container.

3. The nozzle for spouting a liquid phase according to claim 1, wherein the inner diameter of the capillary tubes or pores is 5 times or more the maximum particle diameter of particle components contained in the liquid phase, and the capillary tubes or pores are formed in a straight line.

4. The nozzle for spouting a liquid phase according to claim 2, wherein the inner diameter of the capillary tubes or pores is 5 times or more the maximum particle diameter of particle components contained in the liquid phase, and the capillary tubes or pores are formed in a straight line.

* * * * *